United States Patent [19]
Dierberger et al.

[11] Patent Number: 4,655,044
[45] Date of Patent: Apr. 7, 1987

[54] COATED HIGH TEMPERATURE COMBUSTOR LINER

[75] Inventors: James A. Dierberger, Hebron; Thomas F. Tumicki, Yantic, both of Conn.

[73] Assignee: United Technologies Corporation, Hartford, Conn.

[21] Appl. No.: 563,848

[22] Filed: Dec. 21, 1983

[51] Int. Cl.[4] .......................... F02C 1/00; F02G 3/00
[52] U.S. Cl. .......................... 60/753; 60/757
[58] Field of Search .......................... 60/752, 753, 755, 757, 60/39.32, 909; 428/156; 126/146; 431/352; 110/336, 338

[56] References Cited

U.S. PATENT DOCUMENTS

| | | | |
|---|---|---|---|
| 2,937,595 | 5/1960 | Margulis et al. | 60/909 X |
| 3,101,592 | 8/1963 | Robertson et al. | 60/39.12 |
| 3,918,255 | 11/1975 | Holden | 60/753 |
| 3,956,886 | 5/1976 | Sedgwick | 60/753 |
| 3,982,850 | 9/1976 | Jenkinson | 415/178 |
| 3,995,422 | 12/1976 | Stamm | 60/757 |
| 4,077,205 | 3/1978 | Pane et al. | 60/757 X |
| 4,255,495 | 3/1981 | Levine et al. | 428/632 |
| 4,259,842 | 4/1981 | Koshoffer | 60/757 |
| 4,380,906 | 4/1983 | Dierberger | 60/757 |
| 4,485,630 | 12/1984 | Kenworthy | 60/757 |

FOREIGN PATENT DOCUMENTS

| | | | |
|---|---|---|---|
| 658136 | 10/1951 | United Kingdom | 60/753 |

*Primary Examiner*—Carlton R. Croyle
*Assistant Examiner*—Timothy S. Thorpe
*Attorney, Agent, or Firm*—Norman Friedland

[57] ABSTRACT

Each panel of the louver liner of the combustor of a gas turbine engine is coated with a ceramic composition on the surface adjacent the combustion zone with a tapered end at the lip of the cooling air film generating mechanism. A second taper may be incorporated at the back side of the lip of the next adjacent cooling air film generating mechanism.

3 Claims, 2 Drawing Figures

COATED HIGH TEMPERATURE COMBUSTOR LINER

DESCRIPTION

1. Technical Field

This invention relates to gas turbine engines and particularly to the combustion liner.

2. Background Art

This invention constitutes an improvement over the combustor liner disclosed and claimed in U.S. Pat. No. 4,380,906 entitled "Combustion Liner Cooling Scheme" granted on Apr. 26, 1983 in which one of the co-inventors of this patent application which is also assigned to the same assignee, United Technologies Corporation, is the named inventor.

As is well known, the gas turbine engine operates more efficiently at higher temperatures and accordingly the higher the temperature the better the thrust specific fuel consumption (TSFC) can be attained. To this end, it is desirable to fabricate the combustor liner, which sees the hottest temperature of the engine, to endure such high temperatures.

We have found that we can coat the liner so that the coating is dimensioned to have a specific configuration that will allow the liner fabricated of heretofore used material to withstand temperatures that are higher than those heretofore realized and, thus, improving the durability characteristics thereof.

This invention contemplates coating a louvered sheet metal constructed burner liner with a suitable ceramic coating of mag-zirconium composition which is plasma-arc sprayed to define a tapered surface having the thicker portions judiciously located on the base material so as to have a particular thermal/structural relationship. The tapered portion also bears a relationship to the upstream and downstream end of each louvered panel so as not to adversely affect the film cooling aspect of the liner and reduce the tendency of flaking off when exposed to the high temperatures.

DISCLOSURE OF INVENTION

An object of this invention is to provide an improved combustor liner for a gas turbine power plant. A feature of this invention is to configure a ceramic coating on a louvered base metal panel to have a taper at the upstream end and/or another at the downstream end. In the double tapered louver configuration the thinnest end of the tapers are in proximity to the lip of the double pass end of each louver. The thickest portion of the coating coincides with the high axial loads in proximity to the mid panel region of each louver.

This invention is characterized by exhibiting minimum weight with extremely durable quality, while being able to withstand extremely high temperatures.

Other features and advantages will be apparent from the specification and claims and from the accompanying drawings which illustrate an embodiment of the invention.

BEST MODE FOR CARRYING OUT THE INVENTION

This invention in its preferred embodiment is utilized on the combustion liner of the type disclosed and claimed in U.S. Pat. No. 4,380,906, supra although, as one skilled in the art will appreciate, it has utility for other types of liners. However, it is important in this invention that the liners incorporate film cooling inasmuch as this invention contemplates a minimal of disruption of the primary cooling film by eliminating any upstream step and/or downstream build-up, as would be the case in heretofore known coated combustors.

Figure 1:
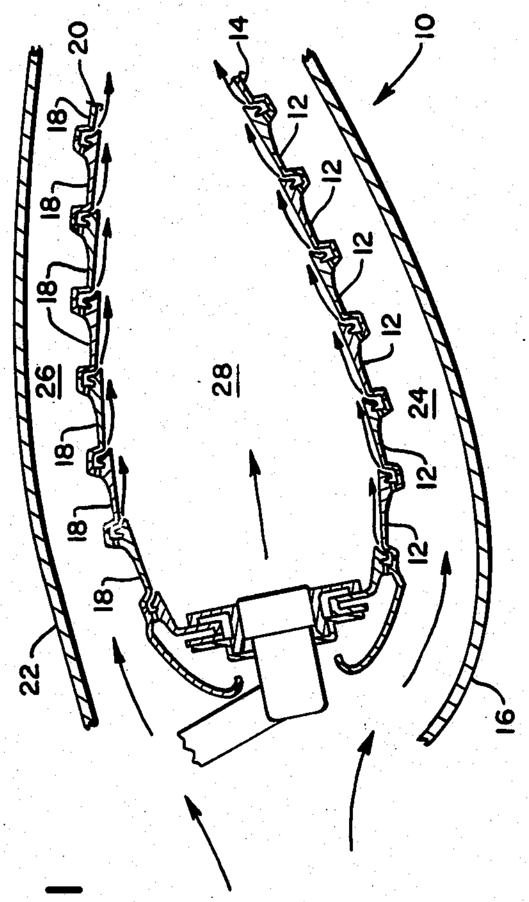
FIG. 1 is a sectional view illustrating a double pass louver liner of an annular type combustor for a gas turbine power plant.

As can be seen in FIG. 1, the combustor generally illustrated by reference numeral 10 comprises a plurality of louver panels 12 defining the outer liner section 14 generally concentric to the outer case 16 and a plurality of similarly constructed louver panels 18 defining the inner liner section 20 which, likewise, is concentric to the inner case 22. The outer liner 14 and inner liner 20 define with the respective cases 16 and 22, annular air passageways 24 and 26 which receive compressor discharge air which air is conducted through the double loop film cooling section of each louver panel to form film cooling of the inner wall adjacent the combustion zone 28, which is the hottest section of the engine. The details of this construction is disclosed in U.S. Pat. No. 4,380,906, supra which is incorporated herein by reference.

Suffice it to say, that because this is the hottest section of the engine, it is critical and the efficacy of the combustor as well as its durability depends largely in part in preventing the film cooling mechanism to operate without impairment.

In accordance with this invention the inner or outer surface of the louver metallic panels are coated with a suitable ceramic composition in a well known plasma arc spraying method. A suitable method of a plasma spraying technique is disclosed in U.S. Pat. No. 4,236,059 granted to C. C. McComas et al on Nov. 25, 1980 which is incorporated herein by reference. The ceramic composition may be a compound of Mag-Zirc and a bond coat may be NiCoCrAlY composition. As mentioned above, the invention is concerned solely with the configuration of the coat and not its composition. Other composites may be equally employed without departing from the scope of this invention.

Figure 2:
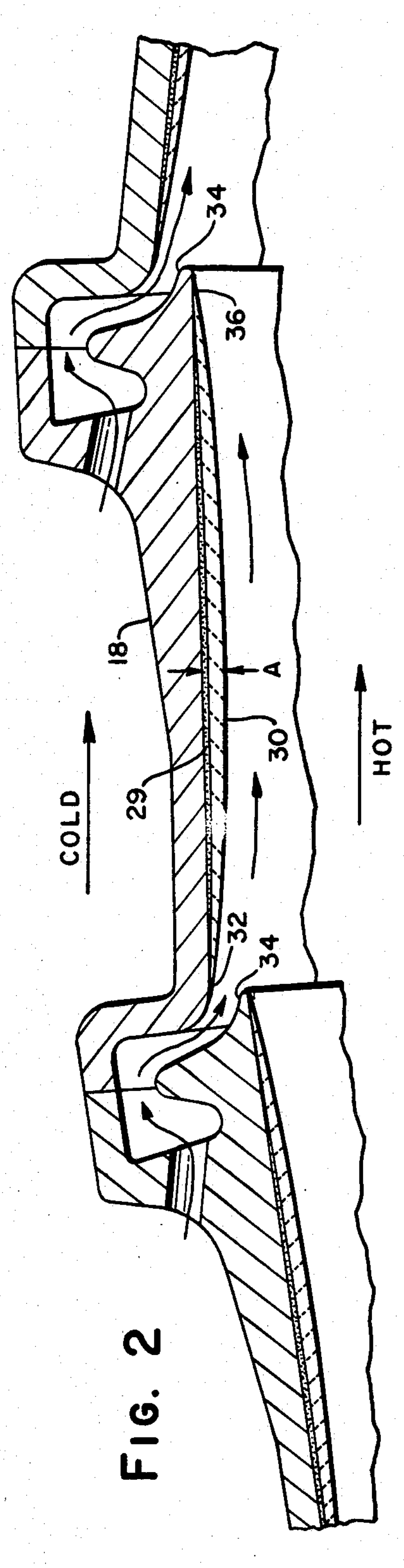
FIG. 2 is an enlarged view of a panel showing the details of this invention.

As shown in FIG. 2 which is an enlargement of one of the panels shown in FIG. 1, the base metal of panel 18 is first coated with bond coat 29 and then subsequently coated with the thermal barrier ceramic coat 30. The thicker portion of coat 30 is applied at around the mid-section of panel 18 and in fact is placed in coincidence with the region of the largest axial bending stress as determined by prior tests. The tapered portion 32 (leading edge) is in the region of lip 34 and is specifically designed to prevent any disturbance to the cooling film. The tapered portion 36 (trailing edge) is at the back side of the lip 34. The double taper serves to minimize film disturbance and ceramic spalling due to lip distortion. By having the thick portion at the point of the highest bending stresses reduces the likelihood of distortions of the louver since this is where the thicker coating serves to minimize the temperature. In some applications it may only be necessary to taper the upstream end at the point where the film is generated rather than both ends.

It should be understood that the invention is not limited to the particular embodiments shown and described herein, but that various changes and modifications may be made without departing from the spirit and scope of this novel concept as defined by the following claims.

I claim:

1. For a combustor for a gas turbine power plant having a plurality of louver panels attached end to end to define a combustion chamber wherein cool air is heated to hot gases, each of said louver panels having an inner surface being subjected to the hot gases in said combustion chamber and an outer surface being subjected to the cooler air of said power plant, cooling air film generating means including a discharge lip formed on the end of each of said louver panels for receiving said cooler air and injecting a film of said cooler air adjacent said inner surface of said, louver panels a ceramic coating on said inner surface of each of said louver panels contiguous with said combustion chamber each of said louver panels being subjected to axial bending stresses and the largest bending stress occurring at a point intermediate its ends, said coating being dimensioned so that one end is gradually tapering from a thickest portion immediately adjacent the point of the largest axial bending stress of each of said louver panels to an upstream end adjacent said tip where the film of cool air is formed.

2. For a combustor as in claim 1 wherein each of said louver panels having a forward end and a rearward end and the forward end and rearward end of adjacent panels forming a passage, said lip being formed at the rearward end of said panel at the exit of said passage, said ceramic coating having an additional taper on the opposite end from said other taper and being disposed against the back of the lip on the rearward end of said one of each of said louver panels.

3. For a combustor as in claim 1 wherein said film generating means is a double pass configuration.

* * * * *